March 21, 1939. L. D. BARTLETT 2,151,261
RECOVERING METAL VALUES
Filed Feb. 5, 1938
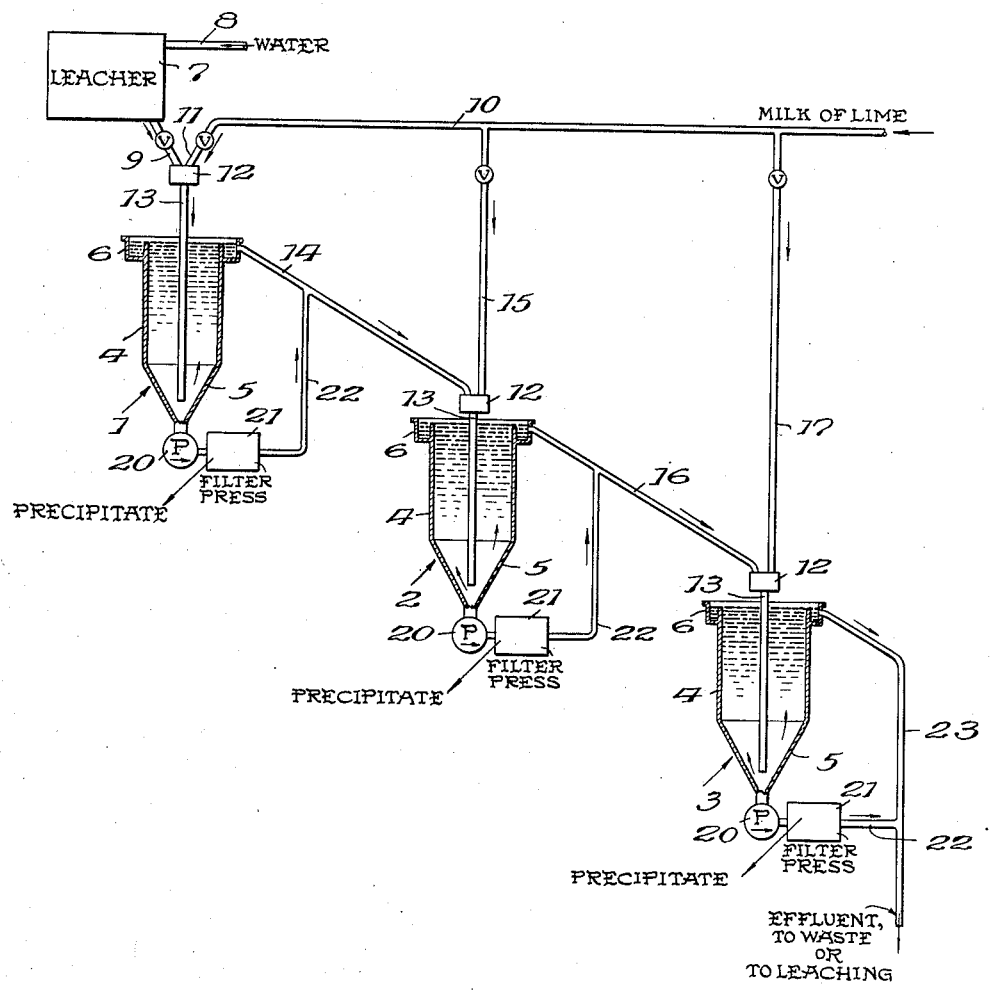

Patented Mar. 21, 1939

2,151,261

UNITED STATES PATENT OFFICE 2,151,261

RECOVERING METAL VALUES

Leland D. Bartlett, Santa Rita, N. Mex.

Application February 5, 1938, Serial No. 189,016

13 Claims. (Cl. 75—108)

This invention or discovery relates to recovering metal values; and it comprises an in-transit method of severally recovering metal values contained as sulfates in mine drainage, ore leachings, etc., with production of an inoffensive effluent, wherein a flow of aqueous solution is treated in transit with successive small individual amounts of CaO with precipitation and removal of the values seriatim in the successive order of iron oxides, alumina, copper oxide, zinc oxide, and cobalt and nickel oxides together; all as more fully hereinafter set forth and as claimed.

Recovery of metal values from dilute solutions, such as mine drainage and ore leachings by a simple, economical and convenient method with production of an inoffensive effluent which can be sent into the stream or return for re-use, presents a double problem. As regards copper, it is solved to some extent by "cementation", passing the water over scrap iron, but the recovery is not particularly good and the effluent is not inoffensive. As a matter of fact, much of the ferrous scrap used contains alloying metals and cementation may contribute metal values to the effluent. In one particular case of drainage water subjected to cementation, the original copper content was 10 pounds per 1000 gallons and the effluent still carried one pound of copper per 1000.

I have discovered that I can efficiently remove and recover the values from these aqueous liquids with production of an inoffensive effluent by utilizing the fact that the metal values can be successively and individually precipitated from sulfate solutions by successive gradual additions of lime, usually as lime water or milk of lime. This fact enables me to employ an economical and labor saving in-transit operation; a flow of liquid being established and maintained through a series of separating compartments- or tanks. The water leaving the last compartment in series is inoffensive and can be sent into a stream or re-used for plant purposes.

I have found that with a particular mine water a treatment with a little lime brings down iron, which is then removed, a second treatment brings down alumina, which is removed, a third treatment brings down copper, which is removed and a fourth zinc. Cobalt and nickel if present can be separated together by a fifth treatment. With proper care, the precipitate in each case is substantially free of the other metals. It usually contains some calcium sulfate but it is pure as regards the particular metal value. This is quite important in treating the particular drainage water specified since it contains both copper and zinc and it is highly desirable from a commercial point of view to produce a copper precipitate practically free of zinc. Copper containing zinc is penalized on the metal market.

There is a current belief in the art that where a solution contains two metal sulfates, nickel and iron for example, an addition of lime in amount sufficient theoretically to precipitate all the iron, does not do so; some iron is left in solution and some nickel oxide joins the iron oxide precipitate. I have found this belief incorrect; I have discovered that under proper conditions commercially pure precipitates can be made from sulfate solutions and there is not the overlapping in result assumed in the prior art.

In the present method operation is in transit; there is a steady flow of liquid through the system. Separation of gel-like precipitates is secured by making one portion of the path of greater cross section, thereby attaining a slow flow at that point, and efficient settling. Operating in this way it is found that at the points of addition of lime there can be obtained clean separation of one oxide from another; the separation being wholly preferential. In other words, using the exact amount of lime at each step, clean, pure precipitates are obtained; hydrated copper oxide is obtained, for instance, substantially free of zinc. Calcium sulfate may occur in the precipitates but otherwise they are pure.

In-transit operation is one of the virtues of the present invention as economizing labor, attention and power. Gravity feed can be used between elements in the system if this be desired. As a matter of fact, an evener flow is obtained than in pump fed systems.

If desired, any two of the metallic constituents can be removed simultaneously, for example, iron and alumina can be taken out together by adding an appropriate amount of lime. But it is commonly better to separate each individually.

Mine water, and leachings from oxidized ores, usually contain the mineral values in rather dilute solution, each metal being present in concentrations of the order of a few pounds per 1000 gallons. Ore leachings usually have higher concentrations than waste mine waters. Mostly these waters are acid, and before proceeding with my precipitation process I bring them just to neutrality with any suitable base, such as burnt lime, limestone, etc. Ore leachings and mine waters can be combined for treatment if desired.

The present invention can be usefully employed in connection with effluent waters from cementation processes. As stated, these always contain some residual copper and they may contain metal values; they may, and usually do, contain other metal values worth recovering. Moreover, the effluent from the cementation plant is not inoffensive; it cannot be sent into a stream without objection. But by using the present method on the effluent from a cementation process, the residual copper is recovered and together with it the other metal values, while inoffensive final effluent is formed.

In the precipitation steps, the lime can be added in various forms, but in the best embodiment of the invention the lime is added as lime water, i. e., a solution, rather than a suspension, of $Ca(OH)_2$. The solubility of lime water is low, about 9.35 pounds (as Ca) per 1000 gallons, but this is not disadvantageous. Using lime water, with proper control the precipitations are surprisingly sharp selective, and the precipitates are contaminated with lime to the minimum extent. Using milk of lime, the bulk of water handled is somewhat less, but the precipitates are contaminated by particles of unreacted lime.

In the accompanying drawing there is shown, more or less diagrammatically, an apparatus organization within the purview of the invention and adapted for carrying out the method.

Referring to the drawing, tanks 1, 2 and 3 are provided, of similar construction but progressively increasing in capacity as shown and arranged for gravity flow of overflows from one tank to another. Each tank has cylindrical walls 4, a conical bottom 5, and a collecting trough 6 around the rim. A leacher 7 of conventional construction is provided, receiving a flow of water through a conduit 8 and discharging leach liquor through a conduit 9. A conduit 10 is arranged for delivery of milk of lime. Conduit 9 is joined with a branch 11 from conduit 10, at a mixing box 12, and the combined flow is introduced to near the bottom of tank 1 through a downwardly extending pipe 13. The liquor rises upwardly through a passage of gradually expanding cross section defined by the conical tank bottom 5. Clear liquid is drawn off at trough 6 by a conduit 14, which joins a branch conduit 15 from the milk of lime conduit, at a second mixing box 12 above tank 2. The mixed flow is delivered to the bottom of tank 2 as in the case of tank 1. Clear overflowing liquor is drawn from trough 6 of tank 2 through a conduit 16, mixed with milk of lime from a branch 17 and introduced to the bottom of tank 3.

Sludge settling in the bottom of tank 1 is pumped out by a pump 20, and filtered in a filter press 21. The precipitate, containing the metal values, is removed and the filtrate joins the clear liquor leaving the collecting trough 6, through a conduit 22. Similar pumps and filters are provided for tanks 2 and 3 as shown. The filtered effluent from the last filter joins the clear liquor from trough 6 of tank 3, which leaves the trough by a conduit 23, and is either disposed of in streams or sent back to the leacher.

In a specific example of the invention applied to a copper-zinc pyrite ore roasted in air in a conventional way to produce sulfates, the ore roast was leached with water, yielding an effluent containing copper, zinc and iron sulfates in solution. This particular leach liquor contained, per 1000 gallons, 15 pounds copper (calculated as Cu), 12 pounds zinc (as Zn), and 8 pounds iron (as Fe), and around 1.5 pounds aluminum (as Al) in the form of an alum. The liquor was first brought to neutrality by addition of a suitable quantity of burnt lime, limestone or another base. Ammonia is not suitable. Nothing precipitates out in this step, the addition of base being stopped just short of any precipitation.

A regulated flow of the neutralized leach liquor, in this example 1000 gallons of leach liquor a minute, was passed through a series of tanks such as shown in the drawing with an addition of lime in each, the lime being added in the form of saturated lime water (the lime water containing 13 pounds $Ca(OH)_2$ per 1000 gallons). The tanks were cylindrical with conical bottoms, and were of asphalted iron. Wood or other suitable material can be used. At the first tank, lime water was admixed at the rate of 760 gallons a minute; this proportion being just sufficient for precipitation of iron. The two admixed streams were introduced directly into the lower portion of the tank, through a pipe extending downward thereto. The first tank had a 90,000 gallon capacity. The others in the series had progressively higher capacities. A precipitate of iron hydroxide settled to the bottom of the tank and the sludge was withdrawn and pumped to a filter press. Any other suitable type of filter can be used. An overflow of supernatant clear liquor was withdrawn by a trough around the top of the tank, and was passed to the base of the next tank in the series, for removal of aluminum. The iron-free filtrate from the filter was combined with this clear tank liquor prior to its entrance to the second tank. In the second tank, lime water was added in the proportion of 280 gallons for each 1000 gallons of the original leach liquor. The total volume of liquor entering the second tank was 1000+760+280 gallons, less the small amount removed with the sludge from the first tank. A precipitate of hydrated alumina formed and settled to the bottom of the tank, and was drawn off and filtered as before. The filtrate was mixed with the supernatant liquor from the tank and lime water, in volume equal to the volume of the original leach liquor (i. e., 1000 gallons lime water per minute), and passed to the third tank. Hydrated copper oxide was precipitated in a similar manner. The copper hydroxide precipitate was filtered. The copper precipitate contained a trace of zinc, but an amount below customary smelter penalty limits. The filtrate was combined with the tank liquor and passed to a fourth tank for removal of zinc. For removal of the zinc, enough lime water was added to ensure precipitation of the zinc. The effluent from the last tank was water of sufficient purity for many purposes and could be discharged into streams without pollution danger.

In the above example, the iron and aluminum could have been removed simultaneously by adding the appropriate quantity of lime water for both metals, in a single operation.

In another specific example, there was taken a waste mine water, containing copper, cobalt and nickel with negligible amounts of iron and alumina and no zinc. The concentrations were 10 pounds copper, 0.3 pound cobalt and 0.2 pound nickel per 1000 gallons. As before the liquid flowed through a succession of chambers, lime being added portionwise in transit. In the first step, 9.5 pounds of the copper were removed (in the form of the hydroxide) by addition of 630 gallons of lime water. In this case copper was not completely removed as it was desired to retain some in the liquor as a carrier for the cobalt and nickel in making a precipitate. A minute quantity of silver in this water was recovered in this last precipitate. In the second step enough lime water was added to make the liquor just neutral to phenolphthalein. The cobalt and nickel precipitated out along with the remaining copper. The effluent was relatively pure water.

In my process generally, the recovery of copper from water is better than 99 per cent, and often as high as 99.8, which is a substantially higher recovery than can be obtained by other methods such as cementation. In lieu of using tanks as described, it is sometimes more convenient to use horizontal troughs or vats, similar to sluice boxes. The operations are similar. Dorr thickeners are useful, and facilitate collection and removal of the precipitates. A moderate amount of agitation of the mixture of mineralized water and lime water is advantageous, as it promotes formation of a precipitate of desirable character, and the Dorr thickener provides agitation of this nature. Violent agitation is to be avoided. Violent and long continued agitation or aeration are not necessary. However, for most purposes coned tanks can be used and these are cheap and convenient.

Addition of the lime water to the mineral solution should, as stated, be gradual and uniform. The operation may be at air temperature.

Generally, the water used as a vehicle for lime is water purified in the system itself. Backcycling water in this way imposes various cyclic flows on the main through flow. While the flows at the inlet and at the outlet to the system are equal at intermediate points the volume in flow is greater; a fact taken into consideration in designing the apparatus.

What I claim is:

1. In the recovery of metal values from dilute solutions containing the same as sulfates with production of a purified effluent, the process which comprises establishing and maintaining a flow of such an aqueous solution through a series of collecting chambers and adding to the liquid in transit prior to entrance into such a chamber an amount of lime, in aqueous solution, substantially equivalent stoichiometrically to the amount of one of said metals in solution, so as to precipitate oxides of only one such metal, and removing such precipitate, the operation being repeated until all desired metals are removed.

2. The process of claim 1 wherein the dilute solution containing metal values is a mine waste water.

3. The process of claim 1 wherein the dilute solution containing metal values is leach liquor from an ore.

4. The process of claim 1 wherein the dilute solution containing metal values is effluent cementation liquor from passage of copper-bearing water over metallic iron.

5. The process of claim 1 wherein the lime is added in the form of lime water.

6. A process of recovering mineral values from water solutions containing, as sulfates, dissolved compounds of metals which have insoluble hydrates, which process comprises neutralizing the solution, establishing and maintaining a flow of the neutralized solution through a series of containers, gradually admixing an amount of lime in aqueous suspension in one container, just sufficient to precipitate one of the metals as an insoluble hydroxide, removing the precipitate, gradually admixing with the remaining liquor in the next container an amount of lime just sufficient to precipitate another of the metals as an insoluble hydroxide, and repeating the process until all desired metals are removed.

7. The process of claim 6 wherein the solution contains sulfates of iron, aluminum, copper and zinc, and these metals are separately removed as insoluble hydroxides.

8. The process of claim 1 as applied to solutions containing cobalt and nickel as well as other values wherein cobalt and nickel oxides are collected together after removal of other values.

9. The process of claim 6 wherein each precipitate is filtered and the filtrate is combined with the liquor going to the next step.

10. A process of recovering mineral values from ores, which comprises leaching the ores to secure a solution containing the metal values as sulfates, neutralizing the solution, establishing and maintaining a flow of the solution through a series of containers, gradually admixing in one container an amount of lime in aqueous suspension just sufficient to precipitate one metal from the solution, removing the precipitate, gradually admixing with the remaining solution in another container an amount of lime just sufficient to precipitate another metal from the solution, as an insoluble hydroxide, repeating the process until all metals are removed, leaving water substantially freed of metal values, and returning the water for extraction of more roasted sulfide ores.

11. In a system for recovering metal values from dilute aqueous solutions containing such values as sulfates with production of an effluent suitable for general water purposes, the combination of a plurality of successive tanks, means for supplying water to be treated to the bottom of the first tank in series, means for admixing the entering liquid with water and lime, and means for removing over-flowing liquid from the first tank and delivering it at the bottom of the second tank and means for admixing lime and water with the inflowing liquid at this point, sludge removing means and separating means at the base of each tank, the separated solid being sent out of the system, and means for delivering the filtrate from the separating means to the next tank in series.

12. In the recovery of metal values from dilute solutions containing the same as sulfates with production of a purified effluent, the process which comprises neutralizing such an aqueous solution in flow, adding gradually to the neutralized solution in flow, with gentle agitation, lime water containing an amount of dissolved lime substantially exactly equal to that which will precipitate the oxide of at least one such metal, removing the precipitate formed, again adding gradually to the solution in flow, with gentle agitation, lime water containing an amount of dissolved lime substantially exactly that required for precipitation of at least one of the remaining metals, removing the precipitate thus formed, and repeating the process until all desired metals are removed.

13. In methods of recovering copper substantially completely from waters containing it in solution as sulfate wherein such a water is passed over extended surfaces of iron so as to remove a major portion of the copper by cementation, iron going into solution, the improvement which comprises neutralizing the solution, gradually adding lime water in stoichiometrical proportions with respect to the dissolved iron, whereby the iron is precipitated out as hydrated oxide, removing the iron precipitate, gradually adding lime water in stoichiometrical proportions with respect to the copper, whereby the copper is precipitated out as hydroxide, and removing the copper precipitate, leaving the water free of iron and copper.

LELAND D. BARTLETT.